(12) United States Patent
Karlsson

(10) Patent No.: US 6,251,325 B1
(45) Date of Patent: Jun. 26, 2001

(54) METHOD AND MOULD TOOLS FOR INJECTION MOULDING A PLASTICS MATERIAL PART IN A PACKAGING SHEET MATERIAL

(75) Inventor: Magne Karlsson, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/269,505
(22) PCT Filed: Sep. 23, 1997
(86) PCT No.: PCT/SE97/01596
  § 371 Date: Mar. 29, 1999
  § 102(e) Date: Mar. 29, 1999
(87) PCT Pub. No.: WO98/18609
  PCT Pub. Date: May 7, 1998

(30) Foreign Application Priority Data
Oct. 31, 1996 (IT) ............................................. MI96A2271

(51) Int. Cl.[7] ............................. B29C 45/03; B29C 45/14
(52) U.S. Cl. ......................... 264/266; 264/275; 425/112; 425/129.1
(58) Field of Search ................................... 264/266, 275, 264/273, 328.1; 425/112, 129.1

(56) References Cited

U.S. PATENT DOCUMENTS

| 4,244,491 | * | 1/1981 | Takahashi et al. | 220/270 |
| 4,893,725 | * | 1/1990 | Ball et al. | 220/269 |
| 5,049,336 |   | 9/1991 | Sjöström | 264/154 |
| 5,395,005 | * | 3/1995 | Yoshida | 220/359 |

FOREIGN PATENT DOCUMENTS

1023886 * 3/1966 (GB).

* cited by examiner

Primary Examiner—Jan H. Silbaugh
Assistant Examiner—Edmund H. Lee
(74) Attorney, Agent, or Firm—Burns, Doane, Swecker & Mathis, L.L.P.

(57) ABSTRACT

A method of injection molding a plastics material opening device in a hole provided in a packaging sheet material including mutually arranging a first mold tool and a second mold tool so as to form a mold cavity in which the hole edge is arranged in so as to biased a sheet portion of the packaging sheet material arranged adjacent the hole edge away from the second mold tool, and injecting heated thermoplastics material into the mold cavity so as to form the plastics material opening device. The biasing of the sheet portion away from the second mold tool aids in the formation of plastics material on the side of the sheet portion disposed towards the second mold tool, for providing a controlled placement of the opening device at the sheet hole.

5 Claims, 3 Drawing Sheets

METHOD AND MOULD TOOLS FOR INJECTION MOULDING A PLASTICS MATERIAL PART IN A PACKAGING SHEET MATERIAL

TECHNICAL FIELD

The present invention relates to a method of injection moulding a plastics material part in a hole which is disposed in a packaging sheet material, and to mould tools in an injection moulding apparatus therefore. In particular, there is disclosed a method and mould tools for injection moulding a synthetic plastics material opening device to a packaging sheet material.

BACKGROUND ART

Opening devices of different types provided on a packaging container formed by packaging sheet material and adapted for containing substances such as foodstuffs, and in particular for containing liquid beverages such as juices, water, milk, wine, etc. are known.

One such opening device includes a perforation on a wall part of the packaging container and a plastics material lid device attached to the wall part and covering the perforation in a closed state. The lid device includes a circumferential base attached to the wall part, for example by means of adhesives, circumferentially surrounding the perforation, and a lid element hinged to the base. Once the lid element is opened, the perforation may be engaged and forced open so that the contents inside the packaging container may be dispensed therefrom.

Another known opening device includes an opening provided on a wall part of the packaging container and a plastics material lid device similar to the one described above attached to the wall part and covering the opening in a closed state. A sealing element such as an aluminium pull tab is connected to the wall part so as to cover the opening, and once the lid element has been opened, the sealing element may be removed to expose the opening for dispensing the contents of the packaging container.

Methods for providing the above opening devices on the packaging containers may include feeding a continuous web of packaging sheet material to a first station at which the perforation or opening is provided on the web, and to a second station at which the lid element is attached to the web for covering the perforation or opening. The aluminium pull tab, if provided i.e. for covering the opening, is attached in an intermediate step. After the opening devices are provided on the web, packaging containers from the web are formed, filled with product, and sealed, such that the opening devices are arranged on the finished container packagings for easy access. One example of a machine for forming, filling, and sealing packaging containers is the TB8 filling machine manufactured by Tetra Brik Packaging Systems of Modena, Italy.

As an alternative to the above opening devices, in which an already formed plastics material lid device is applied to the packaging sheet material, U.S. Pat. No. 4,725,213 (the disclosure of which is incorporated herein by reference) discloses a plastics material opening device which is injection moulded directly onto the sheet of packaging material. In particular, a pair of mould tools are moved into arrangement about a prestamped hole in the sheet, and heated thermoplastics material is injected through an injection passage defined between one of the mould tools and one surface of the sheet and extending along such surface of the sheet in order to form the opening device at the prestamped hole. The mould tools are shaped so that the formed opening device includes a pair of circumferential flange portions each of which is attached to the opposite surfaces of the sheet at the edge of the prestamped hole, thereby attaching the opening device to the sheet.

Although the method and apparatus for providing this latter type of opening device may be completely valid, there exists in the field of thermoplastics material injected opening devices the need for further improvements.

It has been found for example that there exists a problem of controlling the flow of the injected thermoplastics material into the moulding cavity formed by the moulding tools so as to provide a proper positioning of the portion of the sheet adjacent the prestamped opening with respect to the opening device. Generally the portion of the sheet of packaging material adjacent the opening has a very low stiffness and during the injection moulding process such sheet portion is subjected to thermoplastics material at elevated pressures and temperatures. As a consequence this sheet portion adjacent the opening has the undesirable tendency to bend and finally end up in random positions in its connection to the injected opening device. What is needed is a method for injection moulding a thermoplastics material opening device onto a packaging material sheet which allows to achieve uniformity and assuredness with regard to the correct positioning of the sheet with respect to the opening device.

The above described bending tendency of an uncontrolled sheet portion adjacent the opening may lead to a situation in which during the thermoplastics injection step, the edge at the opening of the sheet portion may be in substantial contact with one of the mould tools and consequently plastics material will not flow between such mould tool and the surface of the sheet portion in contact therewith. As a result, the edge of the opening will be sealed in a poorer manner than would be an opening edge in which the plastics material of the opening device extends at least for a certain portion along the surface of the portion of the sheet adjacent the opening. Generally, the packaging sheet material is formed of several layers including an inner paper layer and two outer synthetic plastics material coating layers, one of which is destined to form a product contact surface. Other possible layers such as printing ink layers, laminating layers and aluminium foil layers may be interposed between the paper layer and the outer coating layers. When the opening in the packaging sheet material is stamped, the internal layers of the packaging sheet are exposed at the edge of the opening, and unless such edge is adequately sealed by the injected thermoplastics material opening device, the packaged product may come into contact with the internal layers of the packaging sheet material possibly causing damage thereto. What is needed is a method for injection moulding a thermoplastics material opening device onto a packaging material sheet which allows to assure that an adequate seal is obtained by the injected opening device at the edge of the opening formed in the packaging material sheet.

DISCLOSURE OF THE INVENTION

In accordance with one preferred aspect of the invention, there is provided a method of injection moulding a plastics material part in a hole of a packaging sheet material which includes arranging a first mould tool and a second mould tool in contact with opposite sides of the packaging sheet material so as to form a mould cavity such that the edge of the hole of the sheet is arranged in the mould cavity and such that the packaging sheet material arranged adjacent the hole edge is biased away from the second mould tool, and injecting plastics material into the mould cavity so as to form the plastics material part. The biasing of the packaging material away from the second mould tool aids in the positive formation of plastics material on a portion of the second side of the packaging sheet material arranged adjacent the portion of the hole edge, and consequently a uniformity and assuredness with regard to the correct positioning of the sheet with respect to the opening device is obtained. Moreover, the formation of plastics material on a portion of the second side near the hole edge efficiently creates an excellent seal at the hole edge and at the second side, which aids in assuring that products will not come into contact with the inner layers of the material sheet if and when the second side of the packaging sheet material is destined to be a food contact surface in the final packaging container.

According to another preferred aspect of the invention, there is provided a first mould tool and a second mould tool which are mutually arrangeable with respect to the packaging sheet material in a moulding position such that the packaging sheet material is sealingly disposed between the first and second mould tools and such that a mould cavity is formed by the first and second mould tools in which at least a portion of the hole edge of the packaging sheet material is arranged. The first and second mould tools have a moulding configuration in the moulding position such that the packaging sheet material arranged adjacent the portion of the hole edge is biased away from the second mould tool, thereby to aid in the formation of plastics material on a portion of the second side of the packaging sheet material arranged adjacent the portion of the hole edge.

In one preferred embodiment, the moulding configuration of the first and second mould tools in the moulding position includes an edge of the first mould tool which makes contact with the first side of the packaging sheet material at a first contact line, and an edge of the second mould tool which makes contact with the second side of the packaging sheet material at a second contact line, such that the first contact line is arranged farther from the hole edge than the second contact line. The moulding configuration further includes a gap formed between the first and second mould tools for sealingly accommodating the packaging sheet material, in which the gap has a width dimension which is smaller than an average thickness of the packaging sheet material, thereby to compress the packaging sheet material in the gap in the moulding position. This particular configuration is such that the packaging sheet material arranged adjacent the hole edge is bent at an angle with respect to the plane of extension of the packaging sheet material arranged substantially outside of the mould cavity, thereby to achieve the advantageous biasing action on the sheet.

According to another preferred embodiment of the invention, the moulding configuration of the first and second mould tools includes a gap formed between the first and second mould tools for accommodating the packaging sheet material, in which the gap has an extension which lies in a plane extending angularly into the mould cavity in a direction extending away from the second mould tool, thereby to achieve the advantageous biasing action of the sheet.

The technical characteristics and advantages of the present invention will become apparent to those skilled in the art from the following detailed description of some preferred embodiments thereof, described and illustrated in the accompanying drawings only by way of non-limitative example, wherein like reference numerals indicate like parts.

BEST MODES FOR CARRYING OUT THE INVENTION

Figure 1:
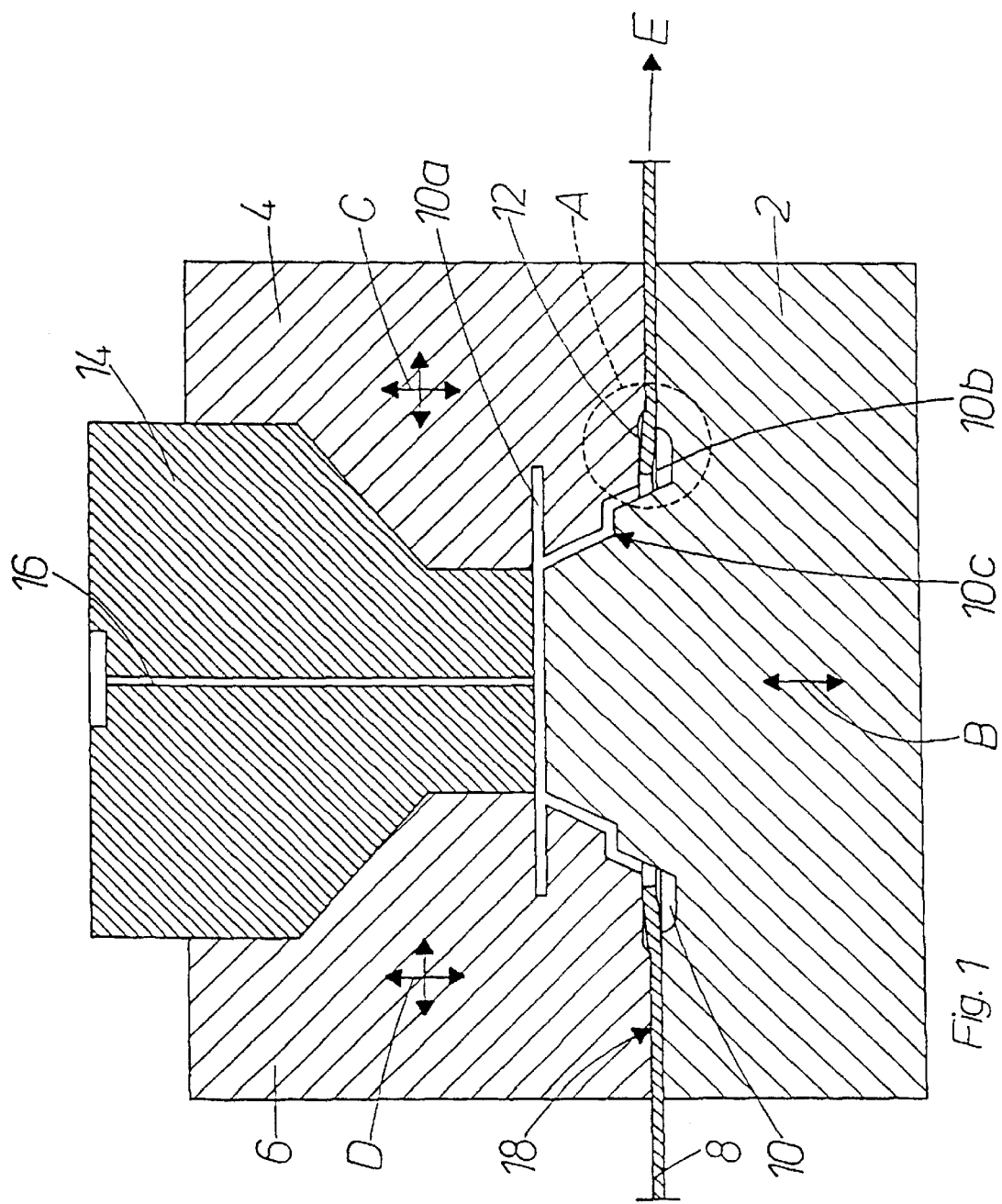
FIG. 1 is a sectional side elevation view of a configuration of mould tools for injecting a thermoplastics material opening device on a packaging material sheet in accordance with one preferred aspect of the invention.

With reference to FIG. 1, an inner mould tool 2 and a pair of outer mould tools 4 and 6 are mutually arranged with respect to a packaging sheet material 8 in a moulding position such that the packaging sheet material is disposed between the inner mould tool 2 and the outer mould tools 4 and 6, and such that a mould cavity 10 is formed by the mould tools in which the edge 12 of a hole provided in the sheet 8 is arranged. The mould tools are also arranged with respect to a thermoplastics injection head 14 so that heated thermoplastics material may be fed through a channel 16 of the head 14 into the mould cavity 10 in order to form, upon cooling of the heated thermoplastics material, an opening device connected to the sheet 8 at the hole edge 12.

The packaging sheet material 8 may be of any type and shape. For example, sheet 8 may be a continuous web of packaging material, or a blank of packaging material, or a protruding flap of packaging material. In one preferred embodiment, sheet 8 is a synthetic plastics coated paper carrier material.

The mould cavity 10 includes in the embodiment shown a portion 10a for forming a lid portion of the opening device, a portion 10b for forming a base portion of the opening device for connection to the sheet 8, and a portion 10c for forming a reduced thickness tearing edge of the opening device for aiding in releasing the lid portion from the base portion. The present disclosure relates more in particular to the manner in which the opening device is attached to the sheet 8 at the hole edge 12 thereof, while the opening device may assume any number of different overall shapes.

In the embodiment shown, the hole edge 12 is circumferential to completely enclose the hole in the sheet 8, and preferably the entire hole edge 12 is arranged inside the base portion 10b of the mould cavity 10 prior to injection, the base portion 10b also being circumferential and having a dimension sufficient to completely enclose hole edge 12. Preferably, the hole edge 12, the base portion 10b, and the connecting portion 10c are ovular ring-shaped in a longitudinal cross section extending substantially parallel to the extension of the sheet, and the lid portion 10a is ovular disc-shaped in a longitudinal cross section extending substantially parallel to the extension of the sheet. Moreover, in the moulding position a gap 18 is formed between the mould tools which preferably has a width dimension smaller than the thickness of the packaging sheet material 8 thereby to compress the sheet 8 inside the gap and form a seal sufficient to prevent any significant leakage of the heated thermoplastics material outside of the mould cavity 10.

The moulding position of FIG. 1 may be obtained in any number of ways as will be apparent to those skilled in the art. For example the inner mould 2 may be moved up and down vertically in the direction of arrow B, and the outer moulds 4 and 6 may be moved up and down vertically, and inwardly and outwardly horizontally, according to the directions C and D respectively, while the injection head 14 may remain in essentially a fixed position. When the mould tools are arranged in a fully open position, the packaging sheet material may be intermittently fed in direction E into a correct position with the hole edge 12 properly aligned, whereupon the mould tools may be moved into their fully closed position corresponding to the moulding position of FIG. 1, and heated thermoplastics material may be fed through the channel 14 of the injection head 14 for filling the mould cavity 10 and forming the opening device on the sheet. Release of the mould tools will permit the sheet 8 to again be fed in the direction E, so as to arrange another hole edge 12 in proper position for receiving an opening device. Downstream after the opening devices are provided on the sheet, packaging containers from the sheet may be formed, filled with product, and sealed. Methods and apparatus sufficient for feeding the sheet 8, for stamping the holes in the sheet 12, for moving the mould tools, for injecting the heated thermoplastics materials, and for forming, filling and sealing the packaging containers are within the realm of those skilled in the art.

Figure 3:
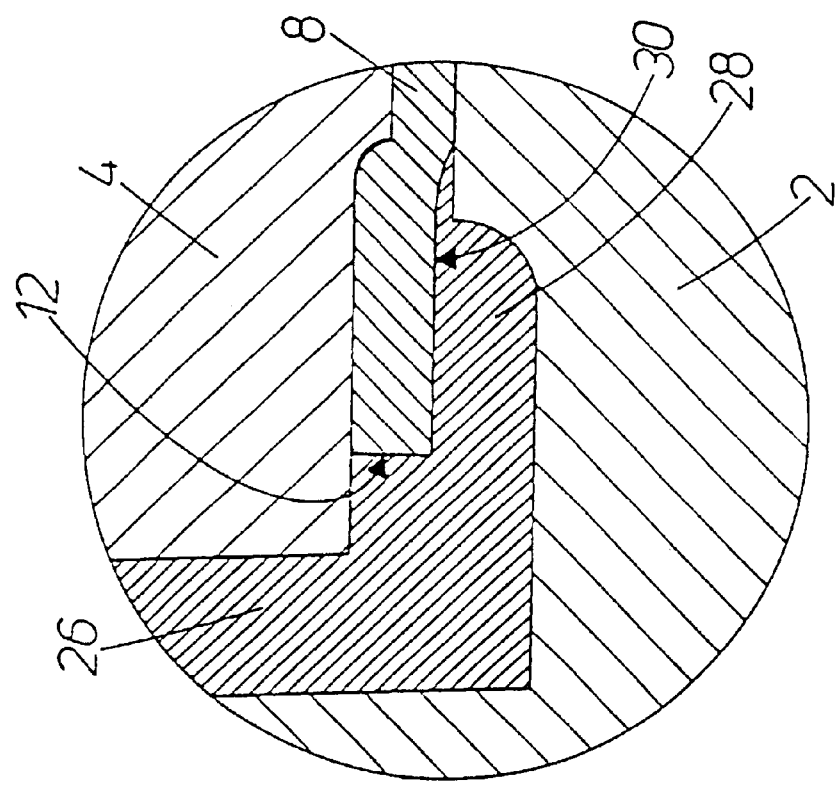
FIG. 3. is an enlarged detail view similar to the detail of FIG. 2, showing the sheet arranged in the mould cavity after the injection of the thermoplastics material opening device.
Figure 2:
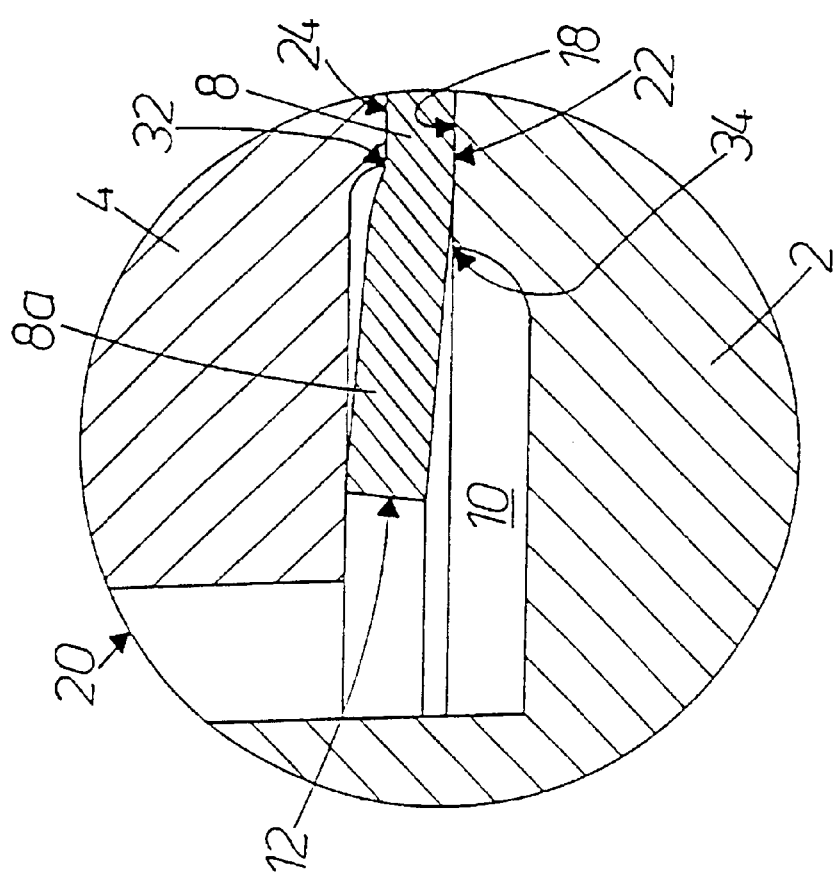
FIG. 2 is an enlarged sectional side elevation view of the detail "A" of FIG. 1, showing a portion of the sheet adjacent a hole in the sheet disposed inside a mould cavity formed by the mould tools before injection of thermoplastics material.

FIG. 2 shows a moulding configuration 20 of the inner and outer mould tools corresponding to the moulding position of FIG. 1. The inner mould tool 2 is arranged in contact with an inner side 22 of sheet 8 while the outer mould tool 4 is arranged in contact with an outer side 24 of the sheet 8. The moulding configuration 20 of the outer and inner mould tools biases the portion of the packaging sheet material 8 arranged adjacent the hole edge 12 away from the inner mould tool 2. Once the biasing of the sheet 8 has been achieved, heated thermoplastics material may be injected into the mould cavity 10 to form an opening device 26 attached to the hole edge 12 of the sheet 8 (FIG. 3). The biasing of the sheet 8 away from the inner mould tool assures that a plastics material portion 28 is formed on a portion 30 of the inner side 22 of the sheet 8 arranged adjacent the hole edge 12.

The biasing of the sheet 8 in the mould cavity 10 and the positive formation of the plastics material portion 28 provides a uniformity and assuredness with regard to the correct positioning of the sheet 8 with respect to the opening device 26, since the sheet is held in a correct and biased position during the step of injection. Moreover, the formation of the plastics material portion 28 at the portion 30 of the inner sheet side near the hole edge 12 efficiently creates an excellent seal at the hole edge and at the inner sheet side, which advantageously aids in assuring that products will not come into contact with the inner layers of the material sheet when the inner side of the packaging sheet material is destined to be a food contact surface in the final packaging container.

The moulding configuration 20 of the inner mould tool 2 and outer mould tool 4 includes an edge of the outer mould tool 4 which makes contact with the outer side 24 of the packaging sheet material 8 at a first contact line 32, and an edge of the inner mould tool 2 which makes contact with the inner side 22 of the packaging sheet material 8 at a second contact line 34, such that the first contact line 32 is arranged farther from the hole edge 12 than the second contact line 34. The compression of the sheet 8 inside the thinner gap 18 formed between the outer and inner mould tools and the spatial arrangement of the first and second contact lines 32 and 34 causes a portion 8*a* of the sheet 8 arranged adjacent the hole edge 12 to be bent at an angle with respect to the plane of extension of the sheet arranged substantially just outside of the mould cavity 10, thereby to bias such sheet portion 8*a* away from the inner mould tool 2.

FIG. 2 shows that in the moulding position, the moulding configuration 20 of the inner and outer mould tools is such that the hole edge 12 of the sheet 8 essentially makes contact with the outer mould tool 4. In this manner, during the thermoplastics material injection step, plastics material is not formed on the outer side 24 of the sheet 8, as seen in FIG. 3. It is however possible to shape the outer mould tool 4 so that the hole edge 12 does not make contact with the outer mould tool 4 even after the sheet portion 8*a* has been biased away from the lower mould tool 2. In this manner the opening device formed by the thermoplastics injection step will include plastics material portions covering both the inner and outer surfaces of the sheet adjacent the hole edge. FIG. 3 also shows a small plastics material portion of the opening device 26 arranged in the gap 18 between the inner mould tool 2 and the inner side 22 of the sheet 8 and formed during the generally high pressure injection step. The compression of the sheet 8 in the gap 18 is however sufficient to form a seal sufficient to prevent any significant leakage of the heated thermoplastics material outside of the mould cavity 10 through the gap 18.

While the described embodiment of FIGS. 1–3 shows the sheet portion 8*a* being biased away from the inner mould tool 2, it has also been envisaged that by changing the relative positions of the contact lines 32 and 34 such that the first contact line 32 is arranged nearer to the hole edge 12 than is the second contact line 34, it is possible to bias the sheet portion 8*a* away form the outer mould tool 4, if so desired. Accordingly, the particular mutual relative spacing of the contact lines for determining the extent and direction of bending of the sheet portion 8*a*, and the particular configuration of the mould cavity formed by the mould tools with respect to the hole edge of the sheet for determining where plastics material portions will be formed, will dictate the particular position of the sheet portion 8*a* in the cavity in the moulding position, so as to assure that the desired final connection and positioning of the opening device to the sheet will be effectively and efficiently obtained.

Figure 4:
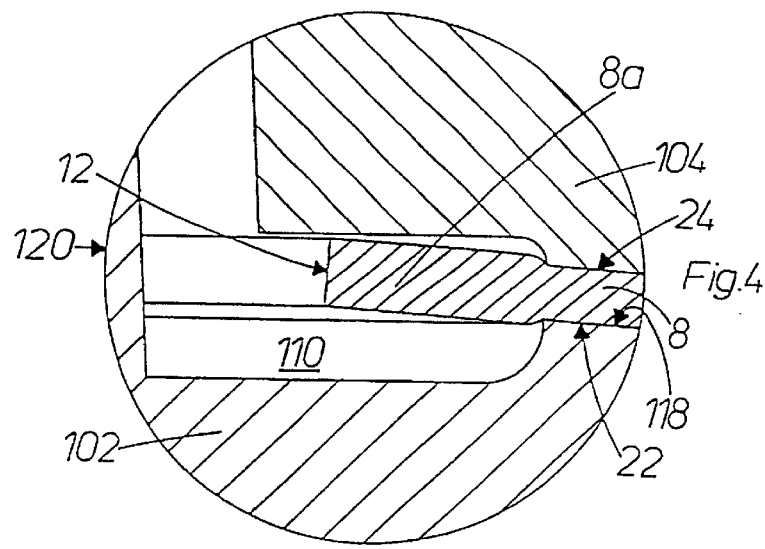
FIG. 4 is an enlarged detail view similar to the detail of FIG. 2, showing mould tools according to another preferred aspect of the invention forming a mould cavity inside which the sheet is disposed before injection of thermoplastics material.
Figure 5:
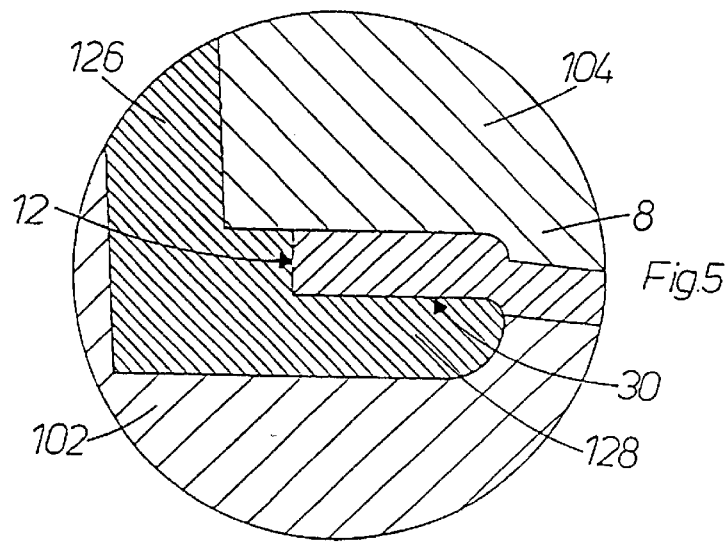
FIG. 5 is an enlarged detail view similar to the detail of FIG. 4, showing the sheet arranged in the mould cavity after the injection of the thermoplastics material opening device.

FIG. 4 illustrates a further embodiment of the invention including a moulding configuration 120 of inner and outer mould tools 102 and 104 mutually arranged in the moulding position such that the inner mould tool 102 is arranged in contact with the inner side 22 of sheet 8 while the outer mould tool 104 is arranged in contact with an outer side 24 of the sheet 8 for compressing the sheet 8 in a thinner gap 118 formed between the moulds, and such that the hole edge 12 is arranged in the mould cavity 110 formed by the inner and outer moulds. The moulding configuration 120 of the outer and inner mould tools 102 and 104 also biases the portion 8*a* of the packaging sheet material 8 arranged adjacent the hole edge 12 away from the inner mould tool 102. Once the biasing of the sheet 8 has been achieved, heated thermoplastics material may be injected into the mould cavity 110 to form an opening device 126 attached to the hole edge 12 of the sheet 8 (FIG. 5). The biasing of the sheet portion 8a away from the inner mould tool assures that a plastics material portion 128 is formed on a portion 30 of the inner side 22 of the sheet portion 8a arranged adjacent the hole edge 12. The biasing of the sheet portion 8a in the mould cavity 110 and the positive formation of the plastics material portion 128 provides a uniformity and assuredness with regard to the correct positioning of the sheet 8 with respect to the opening device 126, since the sheet is held in a correct and biased position during the step of injection, and the formation of the plastics material portion 128 at the portion 30 of the inner sheet side near the hole edge 12 efficiently creates an excellent seal at the hole edge and at the inner sheet side for aiding assuring that products will not come into contact with the inner layers of the material sheet when the inner side of the packaging sheet material is destined to be a food contact surface in the final packaging container.

The gap 118 of moulding configuration 120 formed between the inner and outer mould tools 102 and 104 has an extension which lies in a plane extending angularly into the mould cavity in a direction extending away from the inner mould tool 102, so as to bias the sheet portion 8a away from the inner mould tool 102 sufficiently so that the plastics material portion is positively formed at the sheet inner side portion 30. In the embodiment of FIGS. 4 and 5 the contact lines at which the edges of the inner and outer mould tools make contact with the inner and outer surfaces of the sheet 8 are arranged substantially mutually opposite and therefore a bending of the sheet portion 8a with respect to the extension of the gap 118 does not occur. Rather it is the extension of the gap 118 itself which sufficiently biases the portion 8a away from the inner mould tool 102 for assuring that the desired connection and placement of the opening device 126 to the sheet 8 is effectively obtained. It has further been envisaged that a combination of the bending effect of the sheet portion 8a, as obtained in the manner described with reference to the embodiment of FIGS. 1–3 by mutually spacing apart the contact lines between the edges of the inner and outer mould tools and the inner and outer surfaces of the sheet, with the angular extension arrangement of the portion 8a into the mould cavity 110 provided by the extension of the gap 118, may provide a biasing action of the portion 8a in the mould cavity suitable to obtain the desired positioning of the opening device on the sheet.

FIG. 4 shows that the hole edge 12 of the sheet 8 is slightly spaced with respect to the upper mould tool 104 in the moulding position. This slight spacing however still provides that heated thermoplastics material entering into the mould cavity 110 during the injection phase will push the sheet portion 8a into contact with the outer mould tool so that plastics material is not formed at the upper side of the sheet 8, if so desired.

Figure 6:
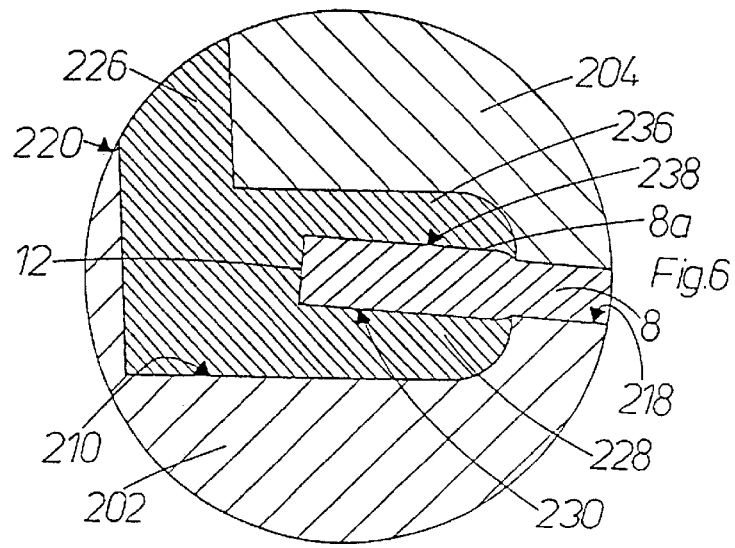
FIG. 6 is an enlarged detail view similar to the detail of FIG. 5, showing mould tools according to another preferred aspect of the invention forming a mould cavity relative to the sheet which allows to inject thermoplastics material on both sides of the sheet.

FIG. 6 shows a variation of the embodiment of FIGS. 4–5 in which a moulding configuration 220 formed by an inner mould tool 202 and an outer mould tool 204 includes an angularly extending gap 218 for biasing the sheet portion 8a in a mould cavity 210 away from the inner mould tool 202, and a spacing between the sheet portion 8a and the outer mould tool 204 which is sufficiently large such that after the thermoplastics injection phase an opening device 226 is formed which includes both a plastics material portion 236 arranged at the outer side 238 of the sheet portion 8a and a plastics material portion 228 arranged at the inner side 230 of the sheet portion 8a.

While the described embodiments of FIGS. 4–6 shows the sheet portion 8a being biased away from the inner mould tool, it has also been envisaged that by changing the direction of extension of the moulding configuration gap, it is possible to bias the sheet portion 8a away form the outer mould tool, if so desired. Accordingly, the particular extension of the moulding configuration gap for determining the direction of extension of the sheet portion, and the particular configuration of the mould cavity formed by the mould tools with respect to the hole edge of the sheet for determining where plastics material portions will be formed, will dictate the particular position of the sheet portion in the cavity in the moulding position, so as to assure that the desired final connection and positioning of the opening device to the sheet will be effectively and efficiently obtained.

What is claimed is:

1. A method of injection molding a plastics material part in a hole disposed in a packaging sheet material for packaging pourable food products, said packaging sheet material defining a first side, a second side, and a hole edge, said method including the steps of:

providing at least one first mold tool and at least one second mold tool;

forming a mold cavity between said first mold tool and said second mold tool by arranging said first mold tool in contact with said first side of said packaging sheet material and arranging said second mold tool in contact with said second side of said packaging sheet material, with said hole edge arranged inside said mold cavity;

biasing said hole edge and a sheet portion of said packaging sheet material arranged adjacent said hole edge away from said second mold tool;

compressing said packaging sheet material in contact with said first mold tool and said second mold tool, into a compressed state with respect to the portion of the packaging sheet material arranged inside the mold cavity;

injecting plastics material into said mold cavity so as to form said plastics material part whereby the biasing of said sheet portion away from said second mold tool aids in the formation of plastics material on a portion of said second side of the sheet portion.

2. The method claimed in claim 1, wherein the step of forming said mold cavity comprises:

moving said first mold tool into contact with said first side of said packaging sheet material to create a first contact line, said first contact line being spaced from said hole edge;

moving said second mold tool into contact with said second side of said packaging sheet material to create a second contact line, said second contact line being spaced from said hole edge; and arranging said first contact line further from said hole edge than said second contact line so as to bias said sheet portion of said packaging sheet material arranged adjacent said hole edge away from said second mold tool.

3. An injection molding apparatus for injection molding plastics material in a hole which is disposed in a packaging sheet material for packaging pourable food products, the packaging sheet material including a hole disposed in said packaging sheet material and defining a hole edge, a sheet portion of said packaging sheet material arranged adjacent said hole edge and a thickness dimension defined by said packaging sheet material, said apparatus comprising:

a first mold tool and a second mold tool, said first mold tool and said second mold tool being mutually arrangeable with respect to said packaging sheet material in a molding position, whereat said packaging sheet material is sealingly disposed between said first mold tool and said second mold tool;

a mold cavity defined by said first mold tool and said second mold tools in said molding position, whereat at least a portion of said hole edge of said packaging sheet material is arranged in said mold cavity;

means for biasing said hole edge and said sheet portion of said packaging sheet material arranged adjacent said hole edge away from said second mold tool, whereby to aid in the formation of plastics material on a portion of said second side of the sheet portion; and a gap defined between said first mold tool and said second mold tool in said molding position for sealingly accommodating said packaging sheet material;

wherein said gap has a width dimension, said width dimension being smaller than said thickness dimension defined by said packaging sheet material, whereby to compress said packaging sheet material in said gap in said molding position.

4. The combination claimed in claim 3, wherein said packaging sheet material has a first side and a second side, and wherein said means for biasing said hole edge and said sheet portion of said packaging sheet material arranged adjacent said hole edge away from said second mold tool comprise:

a first mold tool edge defined by said first mold tool and making contact, in said molding position, with said first side of said packaging sheet material to create a first contact line, said first contact line spaced from said hole edge;

a second mold tool edge defined by said second mold tool and making contact, in said molding position, with said second side of said packaging sheet material to create a second contact line, said second contact line being spaced from said hole edge;

wherein said first contact line is arranged further from said hole edge than said second contact line, for biasing said at least a portion of said hole edge of said packaging sheet material arranged in said mold cavity away from said second mold tool.

5. The combination claimed in claim 4, wherein said gap, defined between said first mold tool and said second mold tool in said molding position for compressing said packaging sheet material, has an extension lying in a plane extending angularly into the mold cavity in a direction extending away from said second mold tool.

* * * * *